United States Patent
Chao et al.

(10) Patent No.: US 7,319,793 B2
(45) Date of Patent: Jan. 15, 2008

(54) VIDEO IMAGE CAPTURING AND DISPLAYING METHOD AND RELATED SYSTEM FOR A WEB CAMERA

(75) Inventors: Tzu-Yi Chao, Hsin-Chu (TW); Chih-Hung Lu, Hsin-Chu (TW); Chuan-Hsin Lee, Hsin-Chu (TW)

(73) Assignee: PixArt Imaging Inc., Hsin-Chu Hsien (TW)

( * ) Notice: Subject to any disclaimer, the term of this patent is extended or adjusted under 35 U.S.C. 154(b) by 620 days.

(21) Appl. No.: 10/904,793

(22) Filed: Nov. 29, 2004

(65) Prior Publication Data

US 2006/0115165 A1    Jun. 1, 2006

(51) Int. Cl.
G06K 9/36 (2006.01)
G06K 9/46 (2006.01)
(52) U.S. Cl. .................. 382/232; 382/239
(58) Field of Classification Search ........... 382/232, 382/233, 239, 250, 240; 348/207.1
See application file for complete search history.

(56) References Cited

U.S. PATENT DOCUMENTS 7,050,096 B2 * 5/2006 Porter et al. ............ 348/231.99
7,274,389 B1 * 9/2007 Hieda ...................... 348/207.1

* cited by examiner

*Primary Examiner*—Phuoc Tran
(74) *Attorney, Agent, or Firm*—Winston Hsu

(57) ABSTRACT

A video image capturing and displaying method for a web camera is disclosed. The method includes the steps of: capturing a video image consisting of a time series of image frames, at an adaptive frame rate, each image frame comprising a plurality of sequential lines of pixels; compressing the captured video image with one of at least a first compressing mode and a second compressing mode; decompressing the compressed video image corresponding to the compressing mode; storing, in a buffer, the decompressed video image which is not displayed in time; and displaying the video image based on the stored video image and the decompressed video image, wherein the adaptive frame rate in the capturing step is determined according to the display quality of the video image being displayed in the displaying step.

9 Claims, 3 Drawing Sheets

VIDEO IMAGE CAPTURING AND DISPLAYING METHOD AND RELATED SYSTEM FOR A WEB CAMERA

BACKGROUND OF INVENTION

1. Field of the Invention

The present invention relates to video image process, and more particularly, to a video image capturing and displaying method for a web camera.

2. Description of the Prior Art

An image transferred over a USB, which usually supports only a limited data transfer rate, can consist of as many as tens of thousands of pixels arranged in rows and columns. For example, an eight-bit gray mode picture image (one frame) captured by a web camera consists of 352×288 pixels and is around 100 Kbs in size. Image discontinuity is not perceptive to human's eyes if the image display rate is higher than 30 frames per second. However, a USB 1.1 has a data transfer rate of one Mbps and can therefore transfer only 10 frames of the eight-bit gray mode picture image per second (100 K×10=1 M). In order to prevent the image discontinuity from occurring, an image has to be properly compressed before being transferred over a USB.

Please refer to FIG. 1, which is a block diagram of an image capturing and processing system 10 according to the prior art. The system 10 comprises an image-capturing module 12, for example a web camera, for capturing a raw image f(i, j) in spatial domain at a constant rate, an image compressing module 14 for compressing the raw image f(i, j) captured by the image-capturing module 12 into a compressed image in a format consisting of a plurality of bit-streamed data, a transmission line 16 for transferring the bit-streamed data, an image-de-compressing module 18 for receiving the bit-streamed data and for de-compressing and recovering the compressed image into the raw image f(i, j), and a display 20 for displaying the recovered raw image f(i, j).

In order to ensure that the compressed image ready to be transferred over the transmission line 16 has a size smaller than 30 Kb (equal to 1 MKb divided by 30 frames), the image-compressing module has to have a variety of delicate components.

Please refer to FIG. 2, which is a block diagram of the image-compressing module 14 according to the prior art. The image-compressing module 14 comprises a discrete Cosine transform (DCT) module 22 for transforming the raw image f(i, j) into a transformed image F(u, v) in frequency domain, a quantization module 24 for quantizing the transformed image F(u, v) into a matrix-formed quantized image Fq(u, v) having low frequency coefficients disposed upper-left while high frequency coefficients disposed lower-right according to a quantization table 26 (non-uniform quantization), a difference pulse code modulation (DPCM) module 28 for generating a DC component of the quantized image Fq(u, v) by recording only the difference between the quantized image Fq(u, v) and a quantized image preceding the quantized image Fq(u, v) in a zig-zag order and decreasing the code scale of the quantized image Fq(u, v), a run length encode (RLE) module 30 for generating an AC component of the quantized image Fq(u, v) by converting consecutive identical characters of the quantized image Fq(u, v), for example consecutive zeros, into a code consisting of the character and the number making the length of the run, the longer the run, the greater the compression, an entropy coding module 32 connected to the DPCM module 28 and the RLE module 30 for generating a bit-streamed data by modeling and coding the DC and AC components of the quantized image Fq(u, v) according to a coding table 34, and a buffer 36 of a moderate size for storing the bit-streamed data ready to be transferred over the transmission line 16. The bit-streamed data comprises a variety of headers, such as a frame header comprising width/height information and horizontal/vertical sampling factors of the raw image f(i, j), and a scan header comprising number of components in a scan.

In contrast to lossless data compressors, such as Huffman, Arithmetic, and LZW used for compressing a text or a program without even a single error introduced, even a single error seriously damaging the meaning of the text or causing the program not to run, the DCT module 22, a so-called lossy data compressor, does not distort the raw image f(i, j) seriously but introduce some tolerable errors inevitably into the recovered raw image after the data-compressing and the data-decompressing processes. A trade-off therefore exists between image quality and the degree of compression, i.e. a compression ratio for lossy compression. The greater the compression ratio is, the more distorted the recovered image becomes.

Fortunately, because human's eyes are high frequency roll-off, known image compression systems remove those high frequencies from the transformed image F(u, v) by adjusting the size of quantization step of the quantization module 24. For example, for uniform quantization, the low frequency coefficients disposed on upper-left corner of the quantized image Fq(u, v) can be quantized based on a first quantization step, while the high frequency coefficients disposed on lower-right corner of the quantized image Fq(u, v) are quantized based on a second quantization step having a size larger than that of the first quantization step. Most of the high frequency coefficients are therefore have a value of zero. Alternatively, the coefficients of the quantized image Fq(u, v) can be quantized based on quantization step of a variable size by looking up a quantization table such as the quantization table 26 for non-uniform quantization.

As mentioned previously, since the USB 1.1 has the data transfer rate of only one Mbps and has to transfer more than 30 frames of image per second to overcome the image discontinuity, and the image-compressing module 14 in general does not have the capability to compress too big (abundance of information) a raw image generated by the image-capturing module 12 at the constant rate into a compressed image having to be 30 Kb or less in size, a hanging phenomenon appears on the display 20 inevitably. On the contrary, if a raw image captured by the image-capturing module 12 is plain and has a corresponding small-sized compressed image, the image-capturing module 12 captures raw images at the constant rate continuously without considering that it still has the image-compressing capability to spare.

SUMMARY OF INVENTION

It is therefore a primary objective of the claimed invention to provide a video image capturing and displaying method and related system for a web camera to overcome the above-mentioned drawbacks.

According to the claimed invention, the video image capturing and displaying method includes the steps of: capturing a video image consisting of a time series of image frames, at an adaptive frame rate, each image frame comprising a plurality of sequential lines of pixels; compressing the captured video image with one of at least a first compressing mode and a second compressing mode; decompressing the compressed video image corresponding to the compressing mode; storing, in a buffer, the decompressed video image which is not displayed in time; and displaying the video image based on the stored video image and the decompressed video image, wherein the adaptive frame rate in the capturing step is determined according to the display quality of the video image being displayed in the displaying step.

According to the claimed invention, the video image capturing and displaying system has: an imaging module for capturing, at an adaptive frame rate, a video image consisting of a time series of image frames, each image frame comprising a plurality of sequential lines of pixels; a video image compressing module, comprising at least a first compressing engine and a second compressing engine, for compressing the captured video image; a video image decompressing module for decompressing the compressed video image corresponding to the compressing engine; a buffer for storing the decompressed video image which is not displayed in time; a display for displaying the video image based on the stored video image and the decompressed video image; and a frame rate controller for adaptively determining the frame rate of the imaging module.

According to the preferred embodiment, the frame rate controller is a computer program stored in a memory, one of at least the first compressing engine and the second compressing engine is a sequential line skipping unit to skip a specific sequential line for displaying, one of at least the first compressing engine and the second compressing engine is a sequential line passing unit for processing a specific sequential line without compression, and the first compressing engine and the second compressing engine have compression ratios different from each other, and are selected from the group consisting of a discrete cosine transform, a differential pulse code modulation, and a wavelet compression.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
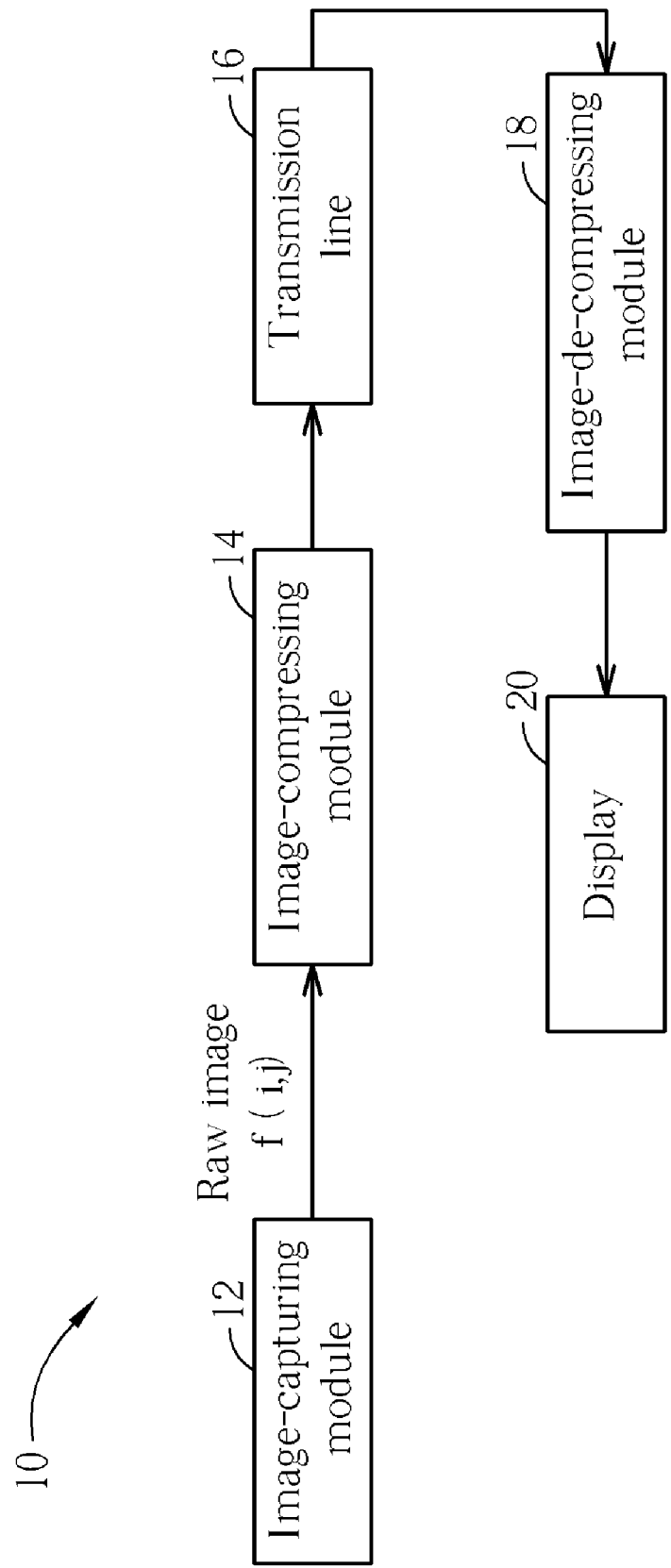
FIG. 1 is a block diagram of an image compressing and processing system according to the prior art.
Figure 2:
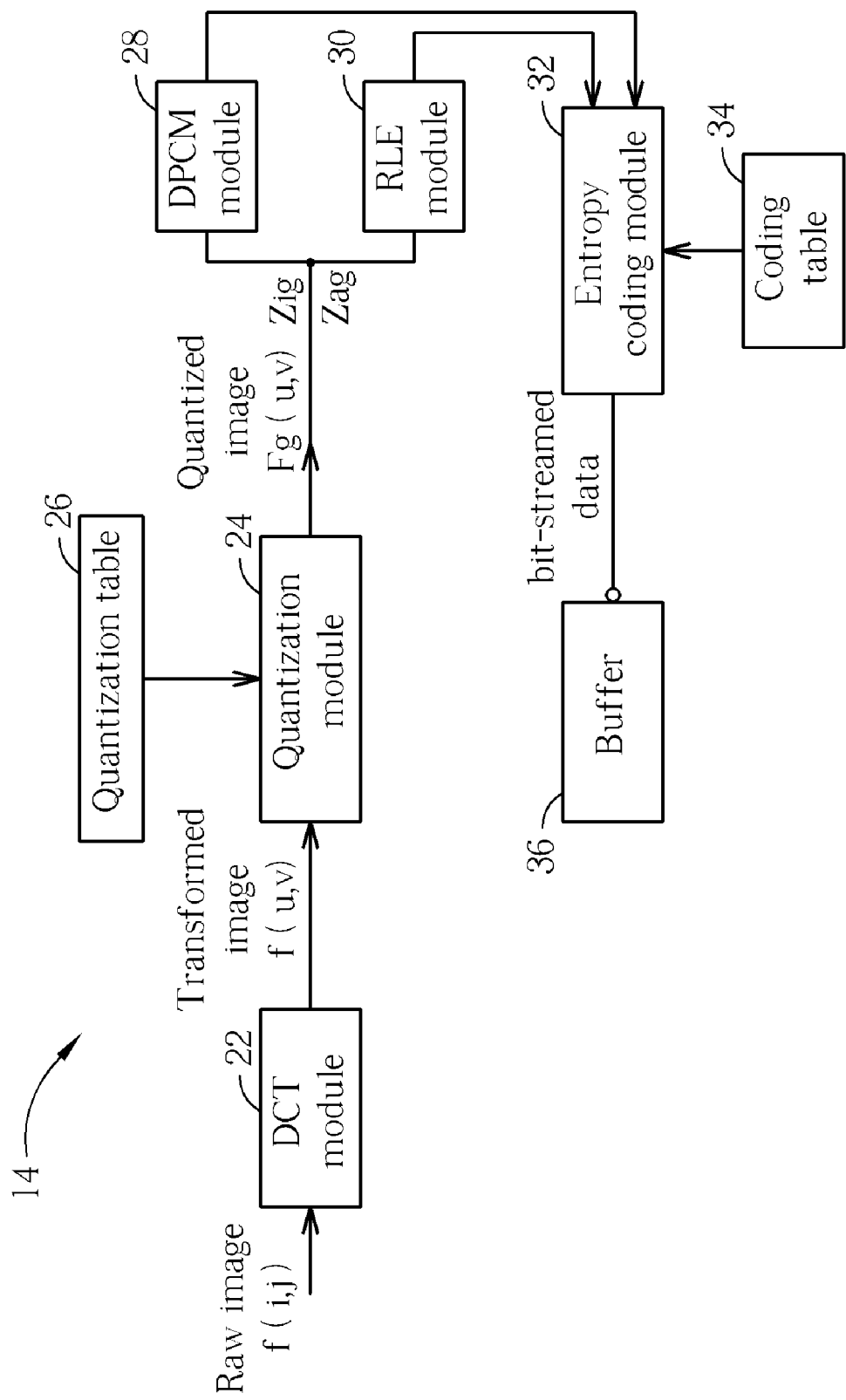
FIG. 2 is a block diagram of an image-compressing module of the image capturing and processing system shown in FIG. 1 according to the prior art.
Figure 3:
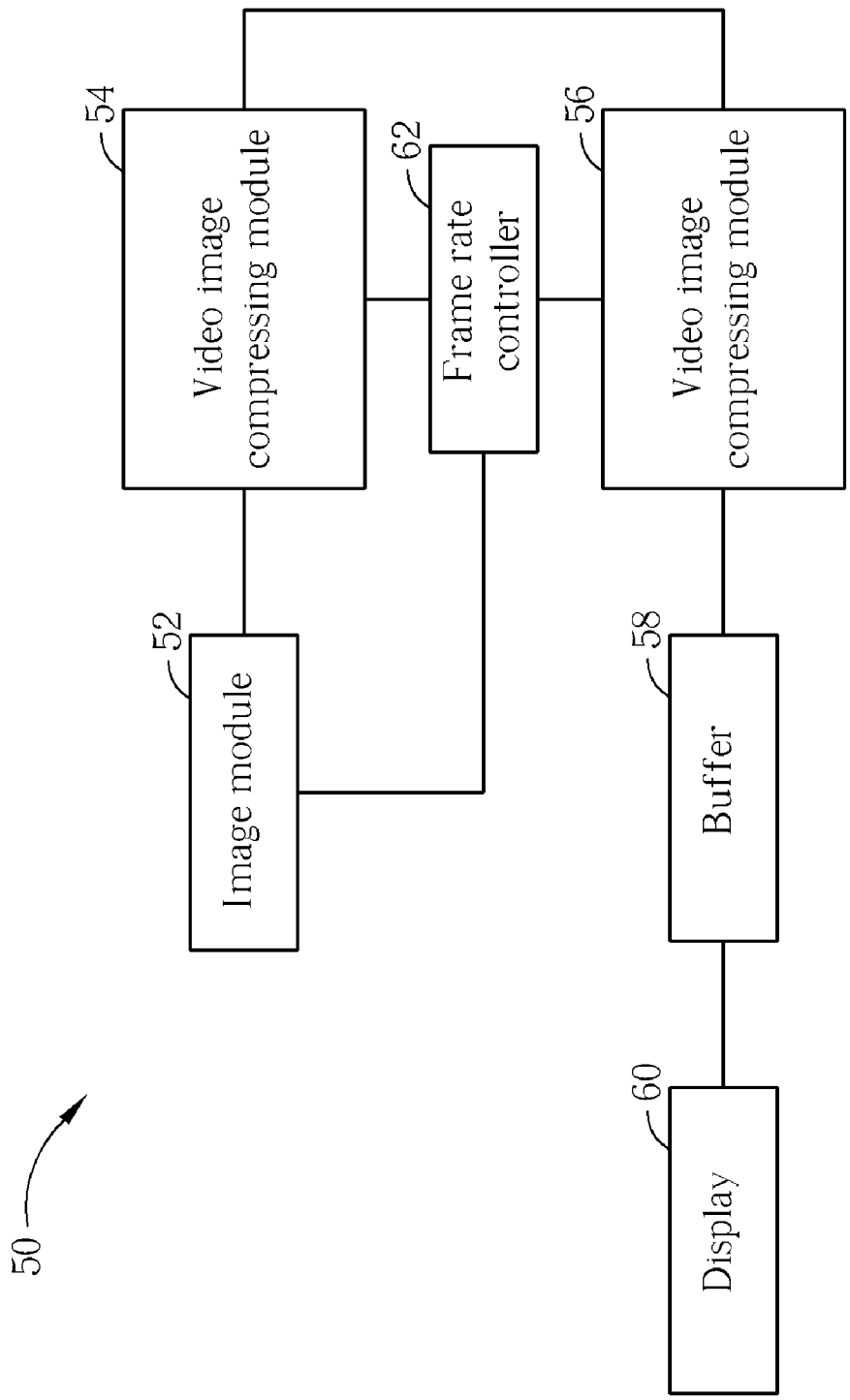
FIG. 3 is a block diagram of a video image capturing and displaying system of the preferred embodiment according to present invention.

Please refer to FIG. 3, which is a block diagram of a video image capturing and displaying system 50 of the preferred embodiment according to the present invention.

The video image capturing and displaying system 50 comprises an imaging module 52 for capturing, at an adaptive frame rate, a video image consisting of a time series of image frames, each image frame comprising a plurality of sequential lines of pixels; a video image compressing module 54, comprising at least a first compressing engine and a second compressing engine, for compressing the captured video image; a video image decompressing module 56 for decompressing the compressed video image corresponding to the compressing engines of the image compressing module 54; a buffer 58 for storing the decompressed video image which is not displayed in time; a display 60 for displaying the video image based on the stored video image in the buffer 58 and the decompressed video image; and a frame rate controller 62 for adaptively determining the frame rate of the imaging module 52.

According to the preferred embodiment, the frame rate controller 62 can be either a hardware device or a computer program, which can be stored in a memory. The first compressing unit of the video image compressing module 52 is a sequential line skipping unit to skip a specific sequential line for displaying, and the second compressing engine is a sequential line passing unit for processing a specific sequential line without compression and has a compression ratio different from that of the first compressing engine. The first compressing engine, and the second compressing engine as well, is selected from the group consisting of a discrete cosine transform, a differential pulse code modulation, and a wavelet compression. The frame compressing module 54 adaptively determines the frame rate of the imaging module 52 according to the display quality of the video image being displayed on the display 60. The video image compressing module 54 compresses each sequential line of pixels as a basic compressing unit.

The operation of the video image capturing and displaying system 50 is described as follows: The imaging module 52, which is controlled by the frame rate controller 62, captures a video image, which consists of a time series of image frames at a predetermined frame rate; The video image compressing module 54 compresses the video image selectively with either the first compressing engine or the second compressing engine; The video image decompressing module 56 decompresses the compressed video image from the video image compressing module 54 according to a decompression ratio corresponding to that of the selected compressing engine; The buffer 58 stores the decompressed video image decompressed by the video image decompressing module 56 and not displayed on the display 60 in time; The display 60 displays the decompressed video image stored in the buffer 58 and decompressed by the video image decompressing module 56.

In the video image capturing and displaying system 50, the display quality is dependent on a signal to noise ratio (SNR) of the video image being displayed on the display 60, the compression ratio of the selected compressing engine.

In contrast to the prior art, the present invention can provide an video image capturing and displaying system, which has an imaging module, a video image compressing module, a video image decompressing module, a buffer, a display, and a frame rate controller. The frame rate controller adaptively determines the frame rate of the imaging module according to the display quality, such as SNR, of the decompressed video image decompressed by the video image decompressing module and being displayed on the display. Therefore, the frame rate controller can increase the frame rate of the imaging module to capture more and clearer video image during a predetermined a time period.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video image capturing and displaying method for a web camera, comprising the steps of:

capturing a video image consisting of a time series of image frames, at an adaptive frame rate, each image frame comprising a plurality of sequential lines of pixels;

compressing the captured video image with one of at least a first compressing mode and a second compressing mode;

decompressing the compressed video image corresponding to the compressing mode;

storing, in a buffer, the decompressed video image which is not displayed in time; and displaying the video image based on the stored video image and the decompressed video image, wherein the adaptive frame rate in the capturing step is determined according to the display quality of the video image being displayed in the displaying step.

2. The video image capturing and displaying method of claim 1, wherein the display quality is dependent on a signal to noise ratio (SNR) of the video image being displayed in the displaying step.

3. The video image capturing and displaying method of claim 1, wherein the display quality is dependent on a compression ratio of the compressing mode adopted in the compressing step.

4. The video image capturing and displaying method of claim 1, wherein the step of compressing the video image compresses each sequential line of pixels as a basic compression unit.

5. A video image capturing and displaying system comprising:

an imaging module for capturing, at an adaptive frame rate, a video image consisting of a time series of image frames, each image frame comprising a plurality of sequential lines of pixels;

a video image compressing module, comprising at least a first compressing engine and a second compressing engine, for compressing the captured video image;

a video image decompressing module for decompressing the compressed video image corresponding to the compressing engine;

a buffer for storing the decompressed video image which is not displayed in time;

a display for displaying the video image based on the stored video image and the decompressed video image; and a frame rate controller for adaptively determining the frame rate of the imaging module.

6. The video image capturing and displaying system of claim 5, wherein the frame rate controller is a computer program stored in a memory.

7. The video image capturing and displaying system of claim 5, wherein one of at least the first compressing engine and the second compressing engine is a sequential line skipping unit to skip a specific sequential line for displaying.

8. The video image capturing and displaying system of claim 5, wherein one of at least the first compressing engine and the second compressing engine is a sequential line passing unit for processing a specific sequential line without compression.

9. The video image capturing and displaying system of claim 5, wherein the first compressing engine and the second compressing engine have compression ratios different from each other, and are selected from the group consisting of a discrete cosine transform, a differential pulse code modulation, and a wavelet compression.

* * * * *